United States Patent
Föhrenbach

(10) Patent No.: US 10,531,610 B2
(45) Date of Patent: Jan. 14, 2020

(54) GUARD TUBE FOR SUPPORTING A DRIVE SHAFT OF A HAND-GUIDED POWER TOOL

(71) Applicant: Andreas Stihl AG & Co. KG, Waiblingen (DE)

(72) Inventor: Jan Föhrenbach, Fellbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 276 days.

(21) Appl. No.: 15/464,381

(22) Filed: Mar. 21, 2017

(65) Prior Publication Data
US 2017/0265388 A1 Sep. 21, 2017

(30) Foreign Application Priority Data

Mar. 21, 2016 (EP) .................................... 16000679

(51) Int. Cl.
- *A01D 34/82* (2006.01)
- *A01D 34/416* (2006.01)
- *F16C 27/06* (2006.01)
- *F16F 15/04* (2006.01)

(52) U.S. Cl.
CPC ........... *A01D 34/82* (2013.01); *A01D 34/416* (2013.01); *F16C 27/063* (2013.01); *F16F 15/04* (2013.01); *F16C 2361/00* (2013.01)

(58) Field of Classification Search
CPC ...... A01D 38/82; A01D 34/90; A01D 34/416; F16C 1/06; F16C 1/28; F16C 27/063; F16C 1/267; F16C 2322/50; F16C 2361/00; F16F 15/04; A01G 3/062; B27B 5/30; F02B 63/02

USPC .............. 464/52; 30/276; 384/220, 222, 297
See application file for complete search history.

(56) References Cited

U.S. PATENT DOCUMENTS

| | | | | |
|---|---|---|---|---|
| 4,927,275 A | * | 5/1990 | Lawson | ................. F16C 17/03 384/220 |
| 4,953,294 A | | 9/1990 | Dohse | |
| 5,839,961 A | | 11/1998 | Andress | |
| 6,314,649 B1 | | 11/2001 | Linsbauer | |

FOREIGN PATENT DOCUMENTS

GB        1 579 203        11/1980

* cited by examiner

*Primary Examiner* — Greg Binda
(74) *Attorney, Agent, or Firm* — Gudrun E. Huckett

(57) ABSTRACT

A guard tube assembly for a drive shaft of a power tool has a guard tube with a tube cross section deviating from a circular shape and having an inner contour and a center. An inner support tube inside the guard tube supports the drive shaft. The inner support tube has a bearing sleeve supported by support elements on the inner contour. The inner contour has a first and a second circumferential section. The first circumferential section has a smallest spacing to the center and the second circumferential section has a largest spacing to the center. The elastic support elements have a contact surface contacting the inner contour and spaced at a contact surface spacing to the center. The contact surface spacing is longer than the smallest spacing of the first circumferential section and shorter than or identical to the largest spacing of the second circumferential section.

17 Claims, 13 Drawing Sheets

GUARD TUBE FOR SUPPORTING A DRIVE SHAFT OF A HAND-GUIDED POWER TOOL

BACKGROUND OF THE INVENTION

The invention relates to a guard tube assembly with a guard tube and an inner support tube for supporting a drive shaft of a hand-guided power tool, wherein the drive shaft and the support tube are extending in longitudinal direction of the guard tube assembly and the support tube has a central bearing sleeve. The bearing sleeve carries elastic support elements and the bearing sleeve is supported by the elastic support elements on the inner contour of the guard tube.

U.S. Pat. No. 4,953,294 discloses a support tube (liner) comprising a bearing sleeve held by means of radial supporting ribs in a protective tube that is cylindrical across its entire length. The support tube is supposed to ensure a vibration-free, wear-resistant support of the drive shaft in the protective tube wherein the drive shaft connects a drive with a rotary tool member. Such a drive connection can operate at rotary speeds of up to 10,000 rpm. A problem in this connection is rotary entrainment of the support tube; for this reason, this patent proposes that at least one supporting rib is to be designed springy in order to achieve a clamping fixation of the support tube in the cylindrical guard tube.

The invention has the object to support a drive shaft which is guided in a guard tube by means of a support tube in such a way that rotary entrainment of the support tube is reliably prevented.

SUMMARY OF THE INVENTION

In accordance with the invention, this is achieved in that:

the guard tube across its axial length between its axial ends has a tube cross section that is deviating from a circular shape and is provided with an inner contour and a center;

the inner contour of the tube cross section comprises at least a first circumferential section with a smallest spacing relative to the center of the tube cross section and at least a second circumferential section with a greatest spacing relative to the center of the tube cross section;

at least one support element of the bearing sleeve is contacting with a contact surface the inner contour of the tube cross section;

the contact surface has a spacing relative to the center of the tube cross section; and the spacing of the contact surface relative to the center is greater than the smallest spacing of the first circumferential section relative to the center and smaller or identical to the greatest spacing of the second circumferential section relative to the center.

The guard tube has across its axial length between the drive and the tool member a tube cross section that deviates from a circular shape and has a non-round inner contour and a center. The non-round inner contour of the tube cross section has at least a first circumferential section with a smallest spacing relative to the center and at least a second circumferential section with a greatest spacing relative to the center. Expediently, the first circumferential section with the smallest spacing relative to the center determines a smallest inner diameter and the second circumferential section with the greatest spacing relative to the center determines a greatest inner diameter of the inner contour. At least one support element of the bearing sleeve is contacting with a contact surface the non-round inner contour of the tube cross section wherein the contact surface has a spacing relative to the center of the tube cross section. In this context, the spacing of the contact surface relative to the center is greater than the smallest spacing of the first circumferential section relative to the center and smaller or identical to the greatest spacing of the second circumferential section relative to the center. Expediently, the contact surface is positioned on a diameter circle about the center wherein the diameter circle has a diameter that is between the smallest inner diameter and the greatest inner diameter of the inner contour.

By suitable selection of the spacing of the contact surface relative to the center, a rotary entrainment of the support tube can be reliably prevented. By the selected spacing in the rotation direction of the drive shaft, a form-fit securing action of the support tube against rotary entrainment is achieved.

Expediently, the bearing sleeve comprises two support elements provided with first contact surface areas and positioned opposite each other relative to the center of the tube cross section. The first contact surface areas have an identical spacing relative to the center of the tube cross section. Relative to the center of the cross section of the bearing sleeve, two oppositely positioned support elements end at a common diameter circle. In this way, a simple centering action of the bearing sleeve within the cross section of the guard tube can be achieved. An eccentric holding of the support tube in the guard tube is advantageously possible also. For this purpose, the support elements can be embodied, for example, to have a different length, respectively.

In an advantageous further embodiment of the invention, a second contact surface area of the support element is contacting the inner contour in the area of the second circumferential section that has the greatest spacing relative to the center of the tube cross section. The contact surface can extend in axial direction of the support tube as well as in circumferential direction of the support tube. When the extension in circumferential direction is small or zero, a linear contact is provided.

The guard tube has across its axial length advantageously an angular tube cross section with rounded longitudinal edges. The tube cross section can be a polygonal cross section, in particular a rectangular cross section or square cross section, but also an oval cross section. In particular, the guard tube between its ends is designed to have the same tube cross section. The guard tube has across its axial length, in particular across its entire axial length, a non-round tube cross section.

In particular, the guard tube has longitudinal edges extending in axial direction, wherein a support element comprises a support rib which is extending in axial direction of the bearing sleeve. In the tube cross section, a support rib is positioned with angular displacement relative to the longitudinal edge of the guard tube in the circumferential direction.

The support elements of the support tube are expediently arranged in accordance with the inner contour of the cross section. Expediently, the support elements are positioned approximately in the area of the rounded longitudinal edges. The maximum inner diameter of the inner contour of the cross section can be determined by the rounded longitudinal edges. When the diameter of the diameter circle on which the support elements are ending is smaller than the maximum inner diameter, an easy axial threading of the support tube into the guard tube is achieved. In particular, it can be provided that the support tube when being threaded is elastically deformed to a smaller diameter circle so that the axial threading of the support tube into the guard tube is facilitated.

In a further embodiment of the invention, the support element comprises a support rib which is extending longitudinally along the bearing sleeve and which is laterally adjoined by a tab at its free longitudinal edge, wherein the tab has a tab width extending in circumferential direction of the bearing sleeve. By means of the tab, an elastically pretensioned mounting of the bearing sleeve in the guard tube can be achieved.

Expediently, the tab extends across preferably the entire axial length of the support rib. The tabs of at least two support ribs are extending in circumferential direction and can point in the same rotational direction. The tabs extend in the same rotational direction away from the respective support rib. It can be expedient that at least two support ribs that neighbor each other have tabs which in circumferential direction are facing each other, i.e., are pointing toward each other.

Advantageously, the arrangement of the support tube in the guard tube is provided such that the tabs of the support ribs at least partially are contacting rounded longitudinal edges of the inner contour of the tube cross section. In this context, the tabs are advantageously positioned under pretension on the inner contour of the tube cross section. Expediently, the tab is at least partially resting flat against a rounded longitudinal edge of the inner contour.

In a further embodiment of the invention, the contact surface of the support element which is resting against the inner contour is formed on the free longitudinal edge of the support rib and/or on the tab and/or on the free longitudinal edge of the tab. In this way, a first contact surface area of the contact surface can be formed by the end of the support rib and a second contact surface area by the tab. As a result of the design of the tab, its contact surface is elastically yielding. The second contact surface area can be referred to as a soft contact surface. The first contact surface area is provided on the longitudinal edge of the support rib which is very stiff in radial support direction. This first contact surface area can be referred to as hard contact surface.

Advantageously, the longitudinal center axis of the bearing sleeve is positioned at a lateral spacing relative to a longitudinal center plane of the support rib. In this context, the support ribs can be arranged about the outer circumference of the support tube at the same angular distance relative to each other. It can be expedient to arrange the support ribs with different angular spacings relative to each other about the outer circumference.

The support tube according to the invention for supporting a drive shaft in a guard tube is comprised of a bearing sleeve and at least three support elements projecting away from the bearing sleeve and comprised of support ribs and tabs. A support rib adjoins the bearing sleeve and extends to a radial outer longitudinal edge which is positioned at a spacing relative to the center of the bearing sleeve. The tab adjoins laterally the radial outer longitudinal edge of the support rib and has a tab width extending in circumferential direction of the bearing sleeve. An outer point of the tab has a maximum spacing relative to the center of the bearing sleeve. This spacing is greater than the spacing of the radial outer longitudinal edge of the support rib relative to the center of the bearing sleeve.

Advantageously, the support ribs are arranged such that the spacings measured in radians between neighboring support ribs are different.

In an advantageous embodiment of the invention, two tabs of support ribs that are neighboring each other are positioned such that they are pointing toward each other.

BRIEF DESCRIPTION OF THE DRAWING

Further features of the invention result from the further claims, the description, and the drawing in which embodiments of the invention are illustrated.

DESCRIPTION OF PREFERRED EMBODIMENTS

Figure 1:
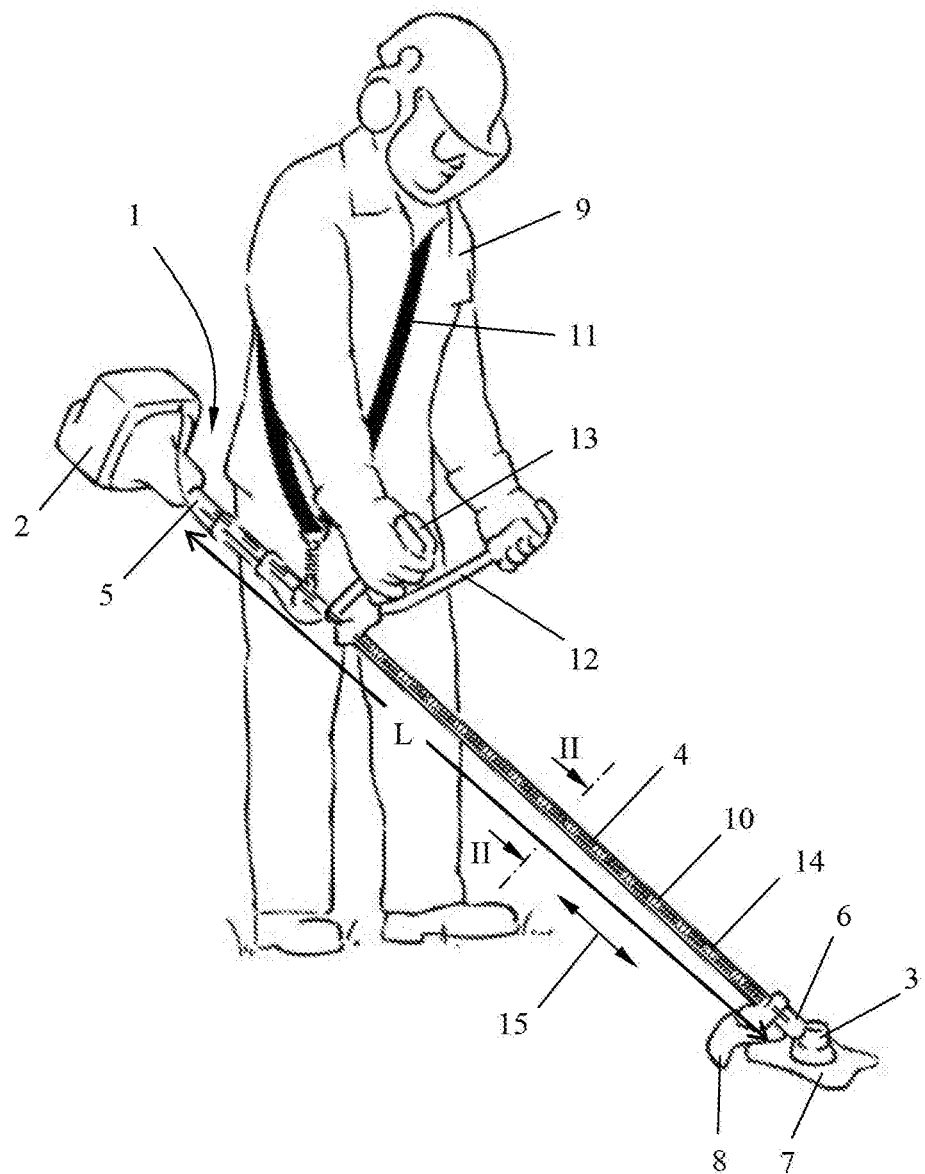
FIG. 1 shows in schematic illustration a trimmer carried by an operator and comprising a drive shaft which is guided in a guard tube assembly.

The power tool illustrated in FIG. 1 is a trimmer 1 which is substantially comprised of a drive 2, a tool head 3, and a guard tube 4 that preferably is made of aluminum or steel. The trimmer 1 is an example of a power tool with a straight guard tube 4. The power tool can also be a pole pruner, a special harvester, a hedge trimmer or the like. The guard tube 4 can also be a curved guard tube.

The drive 2 is fastened to one axial end 5 of the guard tube 4 while the tool head 3 is mounted to the other axial end 6 of the guard tube 4. In the illustrated embodiment, the tool head 3 supports a tool member 7 of the brush knife type. For protecting the operator 9, in the area of the lower axial end 6 of the guard tube 4, a deflector 8 is provided. Depending on the type of tool head, the tool member 7 can also be a saw chain, a hook or hedge trimmer blades.

In the illustrated embodiment, the trimmer 1 is carried by means of belt 11 by the operator 9. At least one grip arranged on the guard tube 4, in the embodiment a handlebar grip 12, serves for holding and guiding the power tool by the operator.

The grip can be connected in this context to the guard tube 4 or can be formed by an area of the guard tube 4. When the guard tube 4 has an outer circumference which is deviating from a circular shape, positive fit between guard tube and separate grip or between guard tube and hand of the operator is achieved. In this way, proper angular orientation of the tool head 3 is facilitated for the operator.

In at least one grip 13, an operating element for the drive 2 is provided. The drive 2 can be embodied as an electric motor, as a two-stroke engine, as a four-stroke engine or the like.

By means of a drive shaft 10 extending in the guard tube 4, the tool member 7 is driven by the drive 2. Within the guard tube 4, the drive shaft 10 is supported by means of a support tube 14 which is comprised in particular of plastic material so that the drive shaft 10 can transmit the drive torque of the drive 2 smoothly to the tool head 3.

The support tube 14 extends in axial direction 15 of the guard tube 4 at least across a portion of the length L of the guard tube 4. Preferably, the support tube 14 extends across the entire length L of the guard tube 4 from its axial end 5 to its opposite axial end 6.

It can be expedient that across the length L of the guard tube 4 a plurality of support tubes 14 are positioned axially in sequence adjacent to each other. The total length of the sequentially arranged sections of support tubes 14 is advantageously at least 60%, in particular at least 80%, of the length of the guard tube 4. A spacing can be formed between the sequentially arranged sections of the support tubes 14.

It can also be advantageous to provide the support tube 14 only across a partial length of the guard tube 4; in particular, the support tube 14 can be embodied as a monolithic component across a partial length of the guard tube 4. The support tube 14 can have a length that amounts to 60% to 80%, preferably more than 80%, and in particular 100%, of the length L of the guard tube 4.

Figure 3:
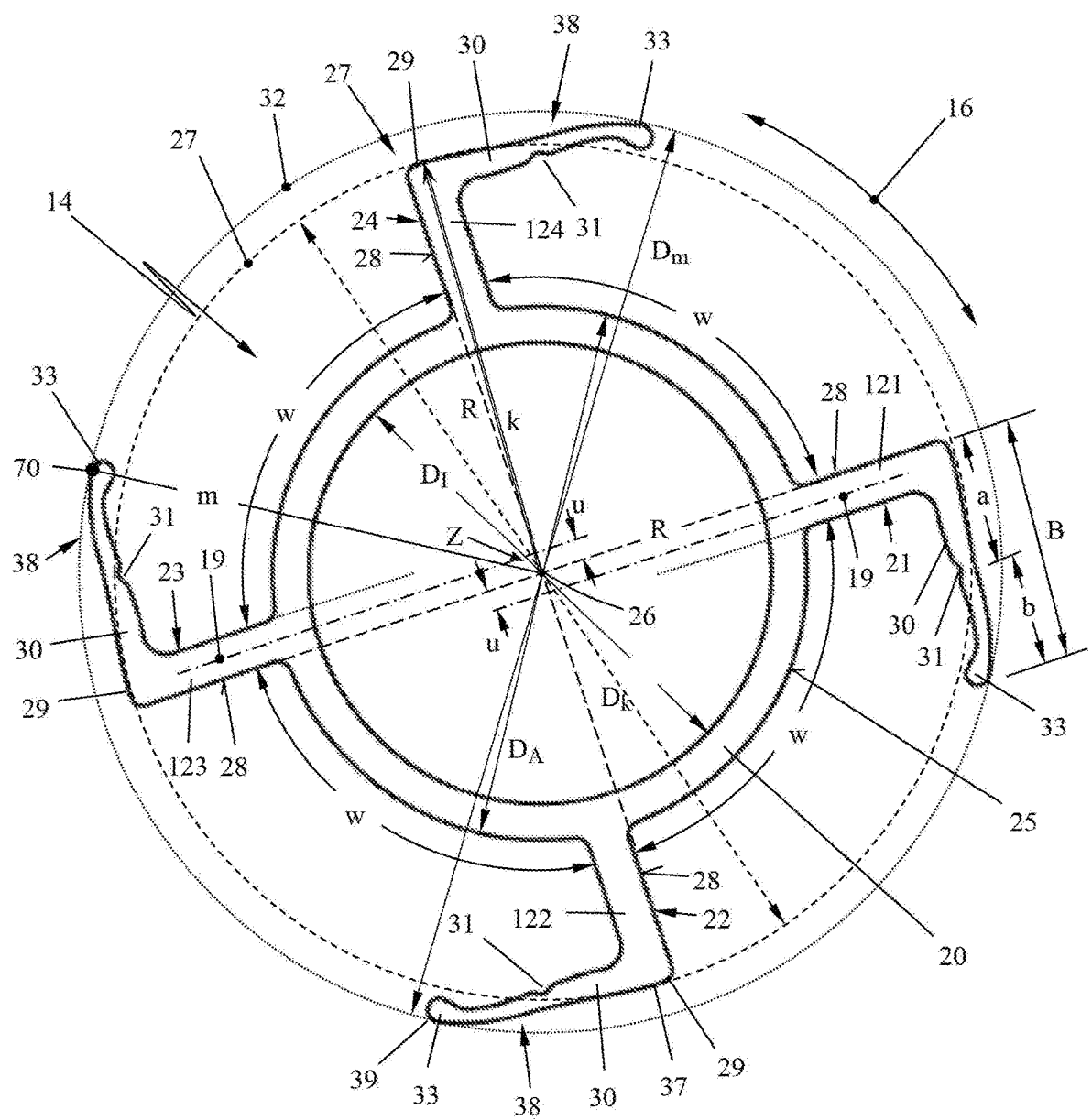
FIG. 3 is a section view of the support tube, illustrated in FIG. 2 and comprised of bearing sleeve and support ribs, in the unloaded state.

An embodiment of a support tube 14 is illustrated in FIG. 3. The support tube 14 is comprised substantially of a bearing sleeve 20 and support elements 21, 22, 23, 24 arranged on the outer circumference 25 of the bearing sleeve 20. In the illustrated embodiment, four support elements are provided and distributed about the outer circumference 25. Embodiments with at least two support elements can be expedient.

In the illustrated embodiments the support elements 21, 22, 23, 24 comprise support ribs 121, 122, 123, 124 which advantageously have projections, in the following referred to as tabs 30. In the illustrated cross section according to FIGS. 2 through 7, the tabs 30 have the shape of a foot attached to the support rib 121, 122, 123, 124. The heel of the foot is formed by the longitudinal edge 29 of the support rib 121, 122, 123, 124 while the middle foot with a free leading end is formed by the free end section 38 of the tab 30 with a longitudinal edge 33.

Figure 4:
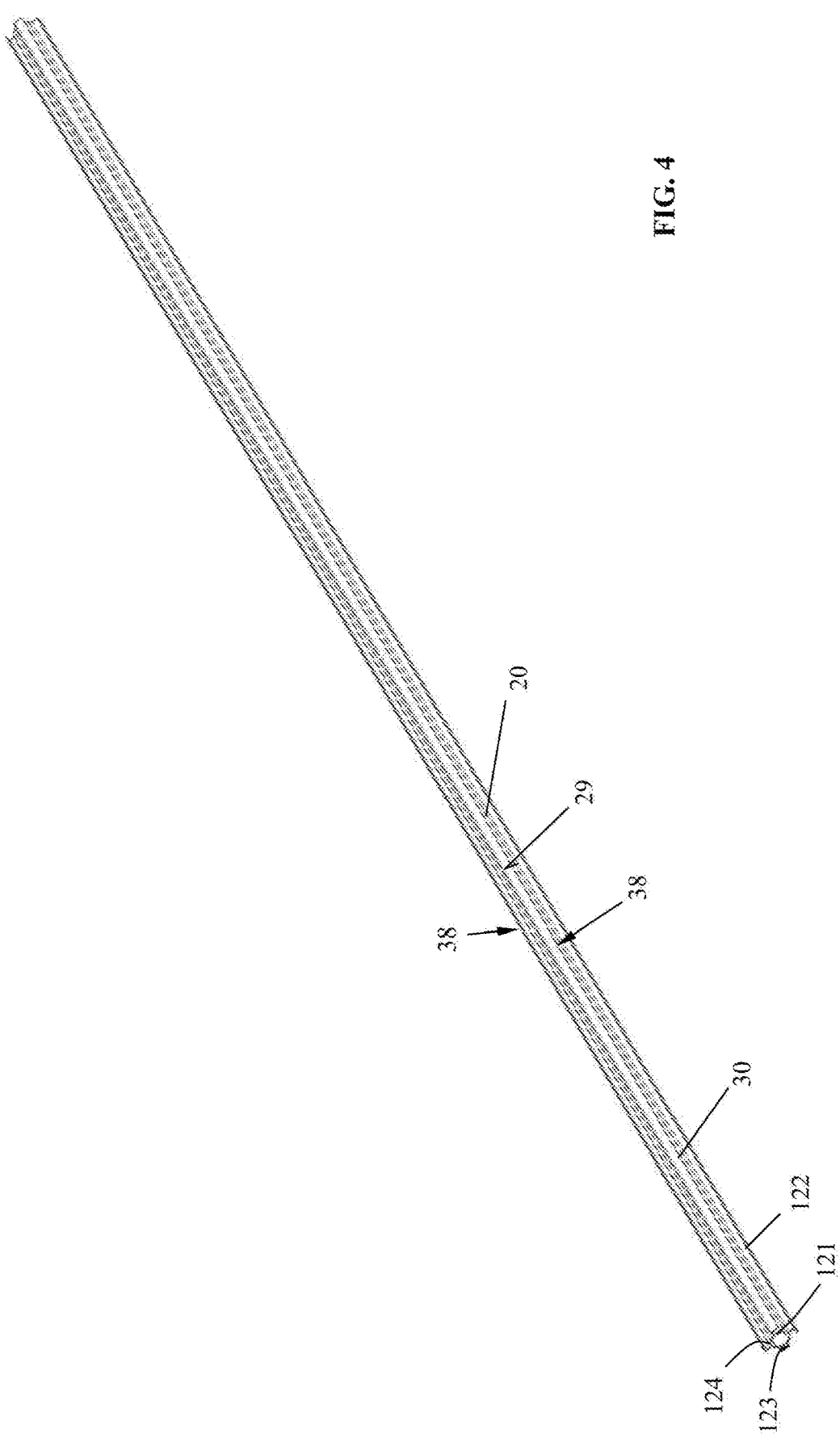
FIG. 4 is an isometric view of the support tube according to FIG. 3.
Figure 7:
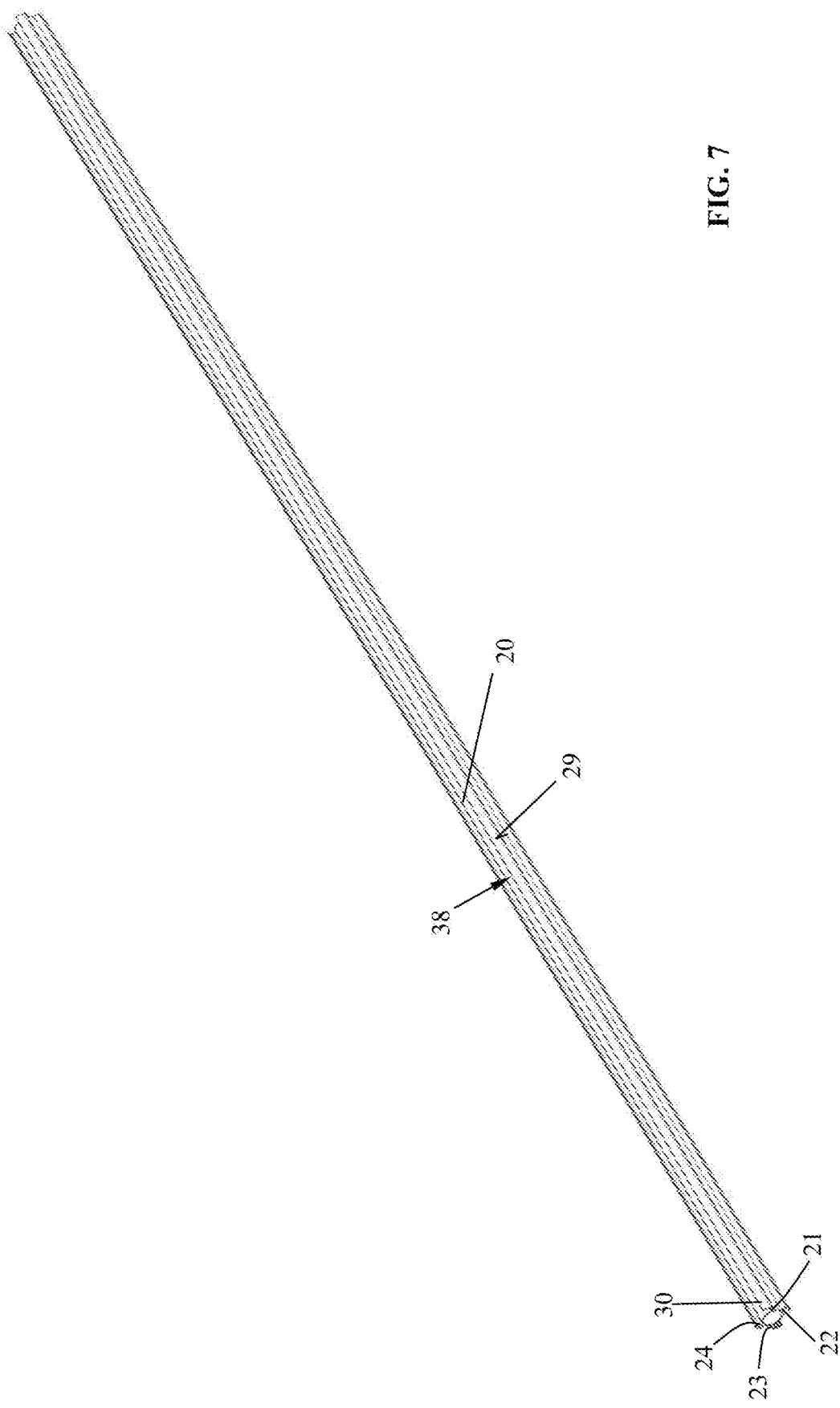
FIG. 7 shows an isometric view of the support tube according to FIG. 6.

As shown in FIGS. 4 and 7, the support ribs 121, 122, 123, 124 extend across the axial length of the bearing sleeve 20. In particular, the support ribs 121, 122, 123, 124 extend across the entire axial length of the bearing sleeve 20. In the same way, the tabs 30 extend across the axial length of the bearing sleeve 20.

It can be expedient that the support ribs 121, 122, 123, 124 extend only across sections of the length of the bearing sleeve 20. In the same way, the tabs 30 extend about the entire axial length or about one or a plurality of axial partial lengths of a bearing sleeve 20. The bearing sleeve 20 can support the support elements 21, 22, 23, 24 across its entire axial length or only partially on one or a plurality of partial lengths. In this way, the stiffness of the bearing action of the support tube 14 in the guard tube 4 can be matched in a targeted fashion to locally occurring loads. The service life of the support tube 14 can be increased in this way. A partial arrangement of support elements can effect material and weight reductions.

In the embodiment according to FIG. 3, the support ribs 121, 122, 123, 124 are arranged with identical angular spacings w measured in radians relative to each other. The support ribs 121, 122, 123, 124 extend approximately radially relative to the support tube axis 26 which in the illustrated tube cross section forms the center Z of the cross section. At least two support ribs 121, 123 or 122, 124 which are approximately positioned opposite each other relative to the center Z of the tube cross section adjoin the bearing sleeve 20 and extend to a radial outer longitudinal edge 29 which is positioned at an edge spacing k relative to the center Z of the bearing sleeve 20. The radial extension of the support ribs 121, 123, 122, 124 is provided such that, viewed in cross section, each support rib 121, 122, 123, 124 ends at a diameter circle 27 with the diameter $D_k$. In the illustrated embodiment according to FIG. 3, all support ribs 121, 122, 123, 124 end at a common diameter circle 27. The longitudinal edges 29 of the support ribs 121, 122, 123, 124 are positioned, viewed in the tube cross section, within an envelope defined by the diameter circle 27.

The longitudinal sides 28 of the oppositely positioned support ribs 21, 23 or 22, 24 that are extending in axial direction 15 of the bearing sleeve 20 and are facing away from the tabs 30 in the embodiment are advantageously positioned in a common plane. This common plane extends, relative to the center Z of the tube cross section, on a radial R through the center Z or through the support tube axis 26 that forms the center Z. The longitudinal center plane 19 of a support rib 121, 122, 123, 124 is positioned at a lateral spacing u relative to the support tube axis 26.

At the free longitudinal edge 29 of a support rib 121, 122, 123, 124, a tab 30 is provided which extends along the longitudinal edge 29 of the support rib 121, 122, 123, 124. The tab 30 adjoins laterally the free longitudinal edge 29 of the support rib 121, 122, 123, 124. In the embodiment according to FIG. 3, the tab 30 extends in circumferential direction 16 on one side of the support rib 121, 122, 123, 124 across a tab width B.

FIG. 3 shows that when the guard tube assembly is demounted the tabs 30 project past the diameter circle 27 of the support ribs 121, 122, 123, 124. The tabs 30 end at a common outer diameter circle 32 with an initial outer diameter $D_m$.

The tab 30 adjoins laterally the radial outer longitudinal edge 29 of the support ribs 121, 122, 123, 124 and extends with a tab width B in circumferential direction 16 of the bearing sleeve 20. The tab 30 has an outer point 70 which is positioned at a maximum spacing m relative to the center Z of the bearing sleeve 20. This outer point spacing m is greater than the edge spacing k of the radial outer longitudinal edge 29 of the support ribs 121, 122, 123, 124 relative to the center Z of the bearing sleeve 20.

As shown in FIG. 3, the tab 30 projects with a partial tab width b past the common diameter circle 27 with the diameter $D_k$. In this context, the tab 30 has on its side which is facing the outer circumference 25 of the bearing sleeve 20 a portion 31 with reduced material thickness which forms a bending location of the tab 30. About this bending location, the section of partial tab width b of the tab 30 can be elastically inwardly bent such that advantageously the entire tab 30 is positioned within the diameter circle 27 of the support ribs 121, 122, 123, 124. Expediently, the section of partial tab width b of a tab 30 can be compressed from its initial diameter $D_m$ by application of a pretension force elastically at least to the diameter $D_B$ which is extending through the bending locations. For installation in the guard tube 4, the tabs 30 are elastically deformed and spring back after installation, i.e., after the support tube 14 has been pushed into the guard tube 4, elastically against the inner contour of the guard tube 4 due to their pretension.

In the embodiment according to FIG. 3, the tabs 30 extend in the same rotary direction, respectively. Beginning at the longitudinal edge 29 of the support rib 121, 122, 123, 124, the tabs 30 point all in the same rotational direction. In the embodiment according to FIG. 3, all tabs 30 extend in clockwise direction.

Figure 2:
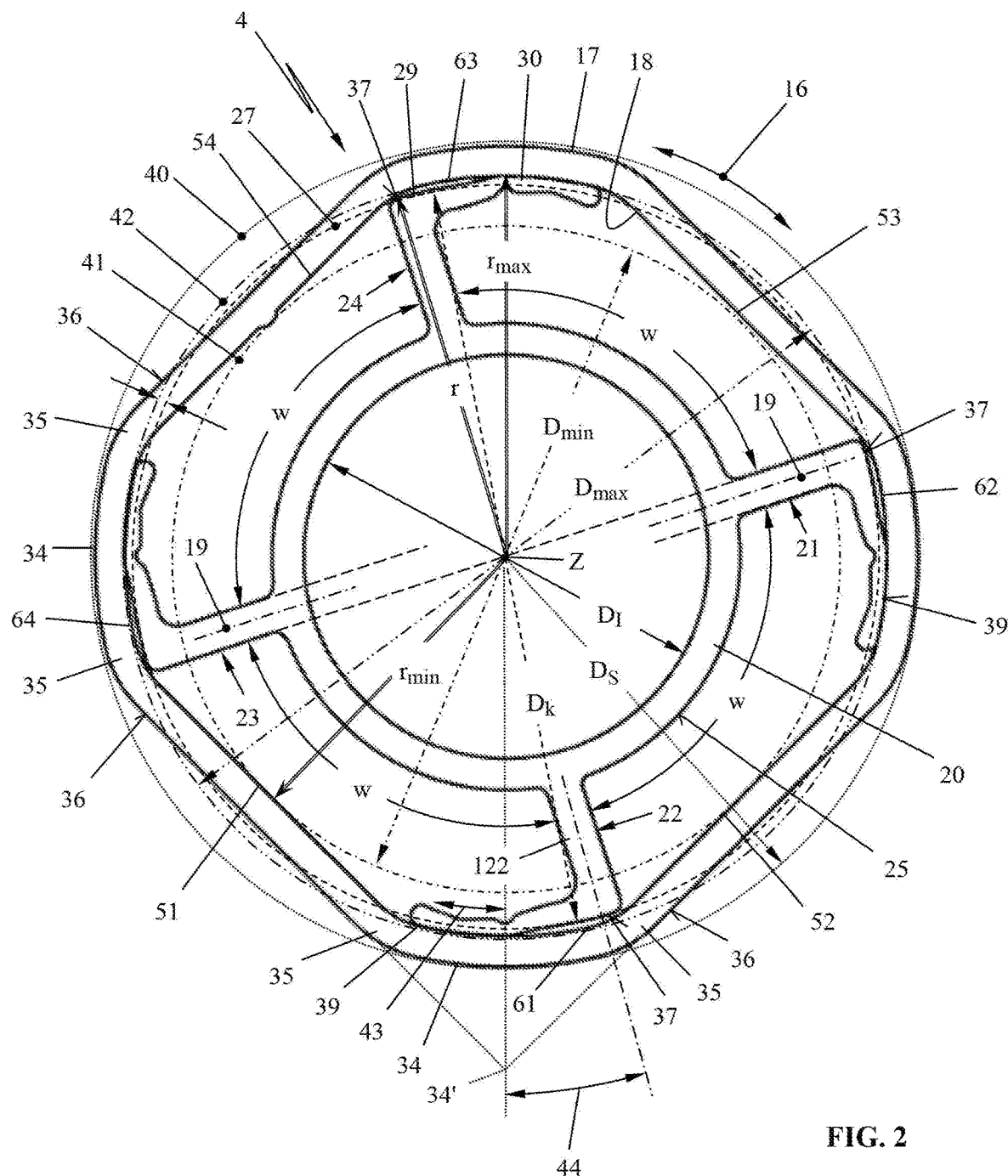
FIG. 2 is a section view of the guard tube assembly along the section line II-II of FIG. 1.

As shown in FIG. 2, the guard tube 4 has a tube cross section 17 which is deviating from a circular shape. In the embodiment according to FIG. 2, an angular tube cross section 17 is illustrated. The tube cross section 17 of the guard tube 4 corresponds approximately to a square with rounded corners. The guard tube 4 is formed between its axial ends 5, 6 about most of its axial length L with the illustrated tube cross section 17. In particular, the illustrated tube cross section 17 is formed across 50%, preferably 70%, and in particular 90%, of the axial length L of the guard tube 4. In a preferred embodiment of the invention, the guard tube 4 is extending across the entire axial length L with a non-round tube cross section 17, in particular with the illustrated tube cross section 17.

The tube cross section 17 has an envelope 40 with a diameter $D_S$.

The inner contour 18 of the tube cross section 17 is comprised of first circumferential sections 51, 52, 53, 54 and second circumferential section 61, 62, 63, 64 which surround the center Z in a circular shape. The first circumferential sections 51, 52, 53, 54 are positioned with a smallest inner spacing $r_{min}$ of the inner contour 18 relative to the center Z of the tube cross section 17. The second circumferential sections 61, 62, 63, 64 are positioned with the greatest spacing $r_{max}$ of the inner contour 18 relative to the center Z of the tube cross section 17.

The inner contour 18 of the tube cross section 17 has such a shape that a first minimal inner diameter $D_{min}$ and a second maximum inner diameter $D_{max}$ are provided. The minimum inner diameter $D_{min}$ defines a first inner circle 41 that touches the first circumferential sections 51, 52, 53, 54 of the inner contour 18. The maximum inner diameter $D_{max}$ defines a second inner circle 42 that touches the second wall sections or circumferential sections 61, 62, 63, 64 that form the rounded corners or longitudinal edges 34 of the inner contour 18.

The support tube according to FIG. 3 is axially pushed into the guard tube 4 according to FIG. 2. In this context, at least one support element 21, 22, 23, 24 of the bearing sleeve 20 is contacting the inner contour 18 of the tube cross section 17 with contact surface area 37, 39 of the contact surface. The contact is provided such that the contact surface areas 37, 39 are positioned on the inner contour 18 of the tube cross section 17 off center to the longitudinal edge center line 34' of the tube cross section 17.

A first contact surface area 37 contacting the inner contour 18 has a spacing r relative to the center Z of the tube cross section 17. This spacing r of the first contact surface area 37 is greater than the smallest spacing $r_{min}$ of the first circumferential sections 51, 52, 53, 54 relative to the center Z and smaller or identical to the greatest spacing $r_{max}$ of the second circumferential section 61, 62, 63, 64 relative to the center Z.

The first contact surface area 37 is located preferably between a minimum inner diameter $D_{min}$ and a maximum inner diameter $D_{max}$ of the inner contour 18. In this context it is advantageously precluded that the first contact surface area 37 is located precisely on the inner diameter $D_{min}$ or precisely on the inner diameter $D_{max}$. The arrangement corresponds to a form-fit anti-rotation securing action in circumferential direction of the guard tube 4.

Figure 5:
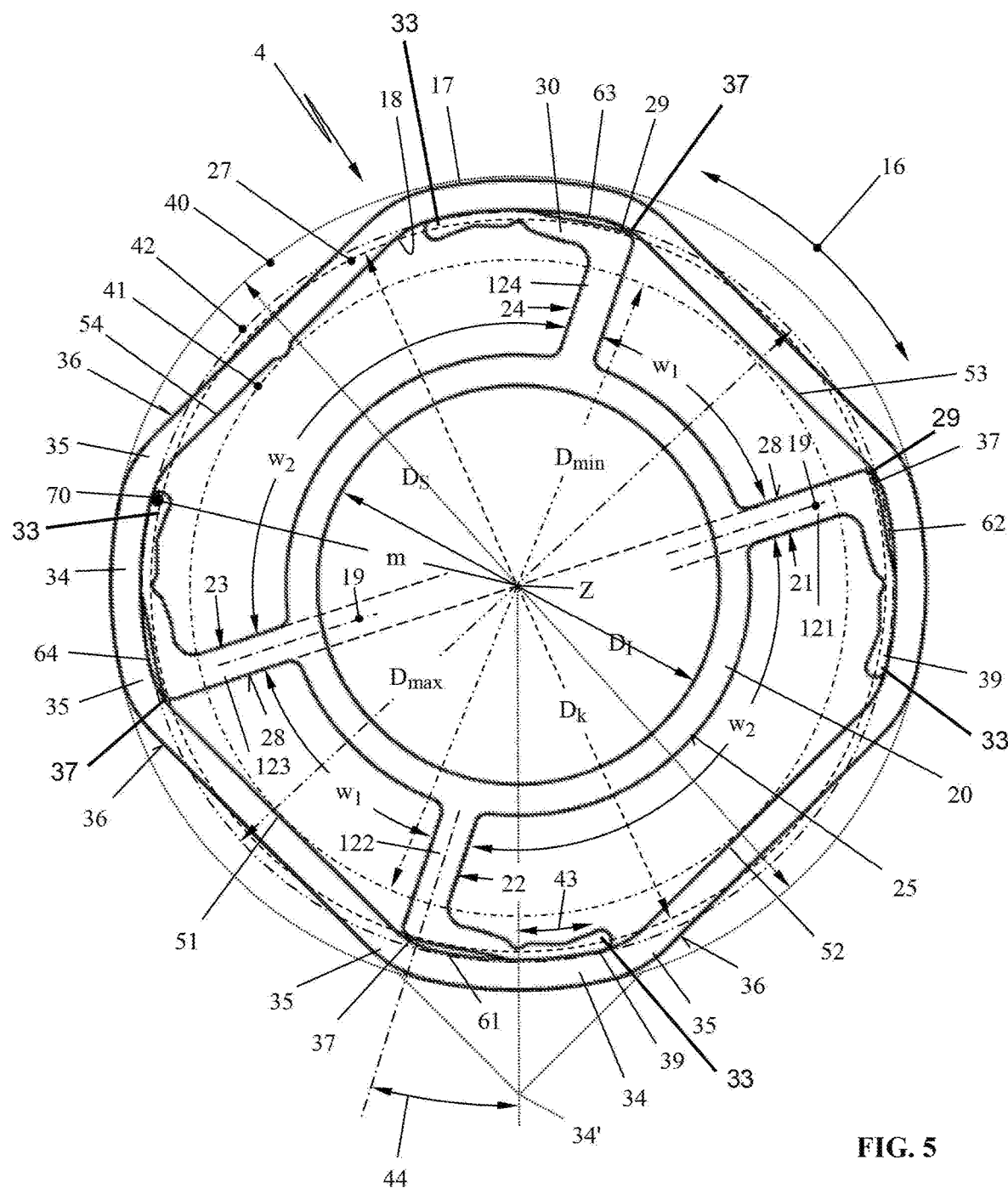
FIG. 5 is a section view of a guard tube assembly in an illustration according to FIG. 2 with a support tube of a further embodiment.

As shown in FIG. 2 and FIG. 5, the contact surface 37 relative to the tube cross section 17 is off center relative to the longitudinal edge center line 34' of the tube cross section 17 with an angular displacement 44. The angular displacement 44 illustrated in FIG. 2 is provided by rotation opposite to the clockwise direction. The angular displacement 44 shown in FIG. 5 is provided by rotation in clockwise direction.

A second contact surface area 39 is formed on the tab 30. The second contact surface area 39 is positioned at a spacing relative to the center Z which corresponds to the maximum spacing $r_{max}$ of the second circumferential section 61, 62, 63, 64 relative to the center Z.

As shown in FIGS. 2 and 5, the contact surface 39 relative to the tube cross section 17 is off center relative to the longitudinal edge center line 34' of the tube cross section 17 at an angular displacement 43. The angular displacement 43 illustrated in FIG. 2 is provided by rotation in clockwise direction. The angular displacement 44 illustrated in FIG. 5 is provided by rotation opposite to the clockwise direction.

Expediently, the support tube 14 with the second contact surface area 39 of the support elements 21, 22, 23, 24 is arranged in the area of the second circumferential section 61, 62, 63, 64. The second circumferential section 61, 62, 63, 64 has the greatest spacing $r_{max}$ relative to the center Z of the tube cross section 17.

The diameter $D_k$ of the diameter circle 27 is selected such that it is positioned between the smallest inner diameter $D_{min}$ and the greatest inner diameter $D_{max}$ of the inner contour 18 of the tube cross section 17 of the guard tube 4. It can be expedient to select the diameter $D_k$ of the diameter circle 27 such that it corresponds to the greatest inner diameter $D_{max}$ or is approximating it.

In the embodiment according to FIG. 2, the longitudinal edges 29 of the support ribs 121, 122, 123, 124 are positioned at the transition 35 from a flat side 36 to the rounded longitudinal edge 34. The first contact surface area 37 of a support element 21, 22, 23, 24 is positioned in the connecting area where the second circumferential section 61 and the first circumferential section 52 join each other. The tab 30 is positioned at least partially on the inner contour 18 of the tube cross section 17. Preferably, the tabs 30 are resting at least partially against the rounded longitudinal edges 34 on the inner contour 18 of the second circumferential sections 61, 62, 63, 64 of the tube cross section 17. In the embodiment according to FIG. 2, the tab 30 is substantially resting across the entire tab width B against the rounded longitudinal edge 34, i.e., against a second circumferential section 61, 62, 63, 64. The second contact surface area 39 of a support element 21, 22, 23, 24 is contacting the second circumferential section 61, 62, 63, 64.

The first contact surface area 37 which is provided on the longitudinal edge 29 of a support rib 121, 122, 123, 124 as well as the second contact surface area 39 which corresponds to the radial outer boundary contour of the tab 30 extend in circumferential direction 16 of the inner contour 18 as well as in axial direction 15 of the guard tube 4. In this way, flat or areal contacts are possible. When the extension of a contact surface in circumferential direction 16 becomes smaller or zero, a linear contact of the contact surface may result. A support rib 121, 122, 123, 124 of a support element 21, 22, 23, 24 is positioned in the tube cross section 17 in circumferential direction at an angular displacement 44 relative to the longitudinal edge center line 34' of the guard tube 4.

In the embodiment, the contact of the second contact surface area 39 on the inner contour 18, as shown in FIG. 2, is provided to be flat or areal at least across a partial circumference, in particular about the partial tab width b.

Figure 6:
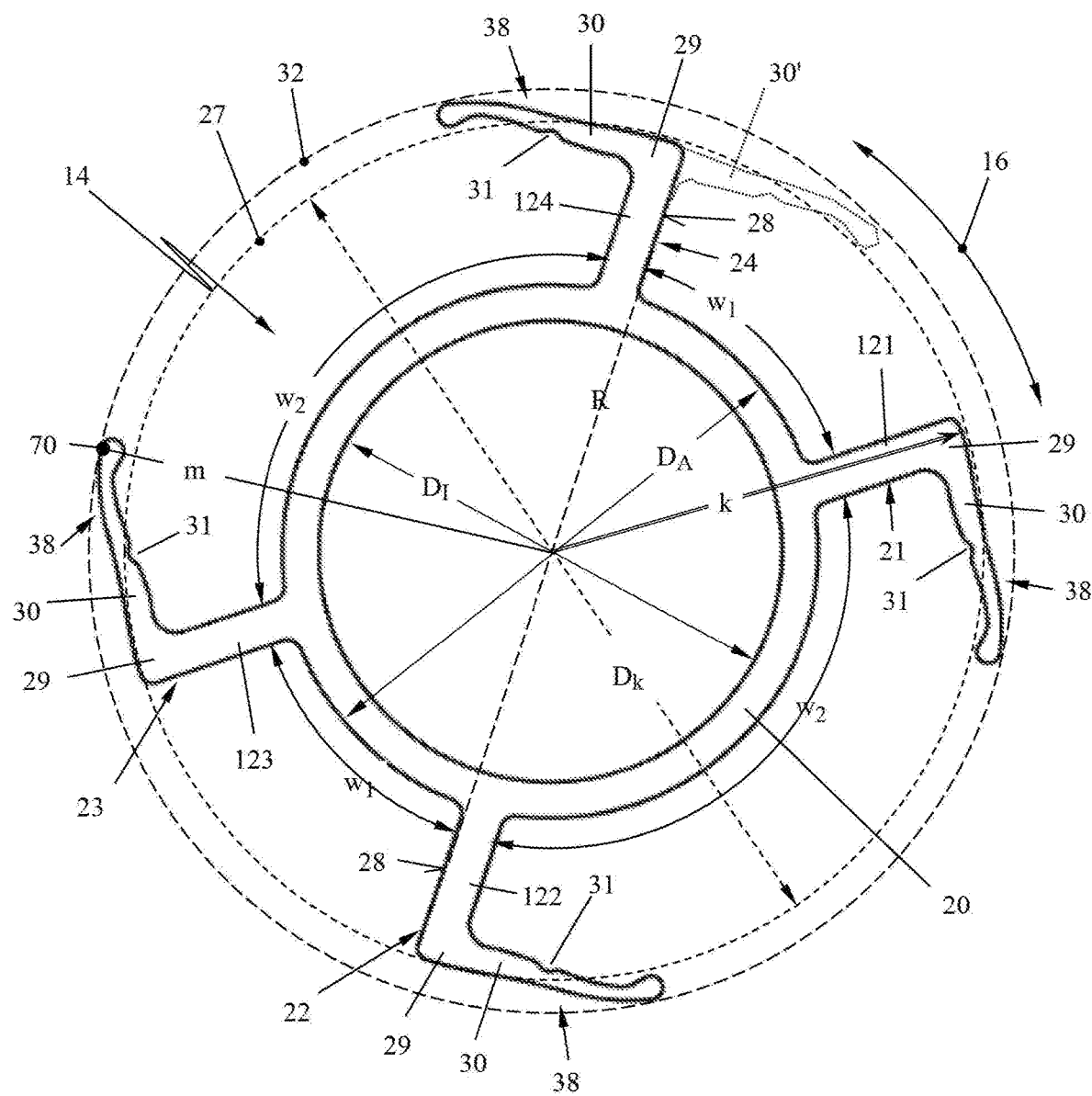
FIG. 6 is a section view of the support tube illustrated in FIG. 4 in the unloaded state.

In the embodiment according to FIGS. 5 to 7, the basic configuration corresponds to that of FIGS. 2 to 4 so that for same parts the same reference characters are employed.

In the support tube according to FIGS. 5 to 7, the support ribs 121, 122, 123, 124 are arranged on the outer circumference 25 of the bearing sleeve 20 with different circumferential spacings $w_1$, $w_2$ measured in radians. A support rib 21 has relative to one of neighboring support ribs 124 a circumferential spacing $w_1$ and relative to the other support rib 122 neighboring in circumferential direction a circumferential spacing $w_2$. The tabs 30 of the support ribs 121 and 122 with a greater angular spacing $w_2$ are oriented toward each other; this is also shown in the isometric view of FIG. 7. In cross section according to FIG. 6, it is apparent that the tab 30 of the support rib 122 is pointing in the direction toward the support rib 121. The tab 30 of the support rib 121 points in the direction toward the support rib 122. The same holds true for the tabs 30 of the support ribs 123 and 124.

The arrangement of the support ribs 121, 122, 123, 124 within the inner contour 18 of the tube cross section 17 is provided again in such a way that a support rib 121, 122, 123, 124 is arranged at the level of a transition 35 from a flat side 36 into the rounded longitudinal edge 34. A support rib 121, 122, 123, 124 is positioned thus at the transition from a first circumferential section 51, 52, 53, 54 into a second circumferential section 61, 62, 63, 64. The tab 30 extends in circumferential direction 16 across the rounded longitudinal edge 34, i.e., a second circumferential section 61, 62, 63, 64, wherein the tab 30 at least partially is resting flat or areally against the inner contour 18 of the rounded longitudinal edge 34.

In the embodiments of FIGS. 2 to 7, the support elements 21, 22, 23, 24 comprised of the support ribs 121, 122, 123, 124 and the tabs 30 are designed L-shaped in cross section. It can be expedient to arrange in circumferential direction 16 on both sides of a support rib 121, 122, 123, 124 a tab 30' as indicated in FIG. 6 in dashed lines at the top. In this connection, a T-shaped configuration in cross section is obtained. Other cross sectional shapes can be expedient.

An embodiment of a support tube 14 comprised of a bearing sleeve 20 with support elements 21, 22, 23, 24 that comprise oppositely oriented tabs 30 (FIG. 6) ensures an anti-rotation securing action by form fit of the support tube 14 in the guard tube 4 which is provided in both rotational direction already after a few angular degrees of rotation; this is referred to in the context of the invention as a "hard" stop. When all tabs 30 are of the same orientation, in one rotational direction a securing form fit is immediately provided; this immediate form fit is referred to as hard stop. In the opposite rotational direction, the anti-rotation action is provided by contact of compressed tabs 30 on a flat side of the circumferential sections 51, 52, 53, 54. This stop is referred to as soft. A compression of the tabs 30 sufficient for the anti-rotation action is reached only gradually.

When using a support tube 14 with tabs 30 oppositely oriented in circumferential direction (FIG. 5), the insertion direction of the support tube 14 into the guard tube 4 must not be taken into consideration for installing in the guard tube 4; in both rotational directions, an immediate anti-rotation action between the support tube 14 and the guard tube 4 is ensured.

As illustrated in the embodiments of FIGS. 8 to 13, the tabs 30, 30' can project with their outer boundary contour 47 radially past the support rib 121, 122, 123, 124.

Figure 8:
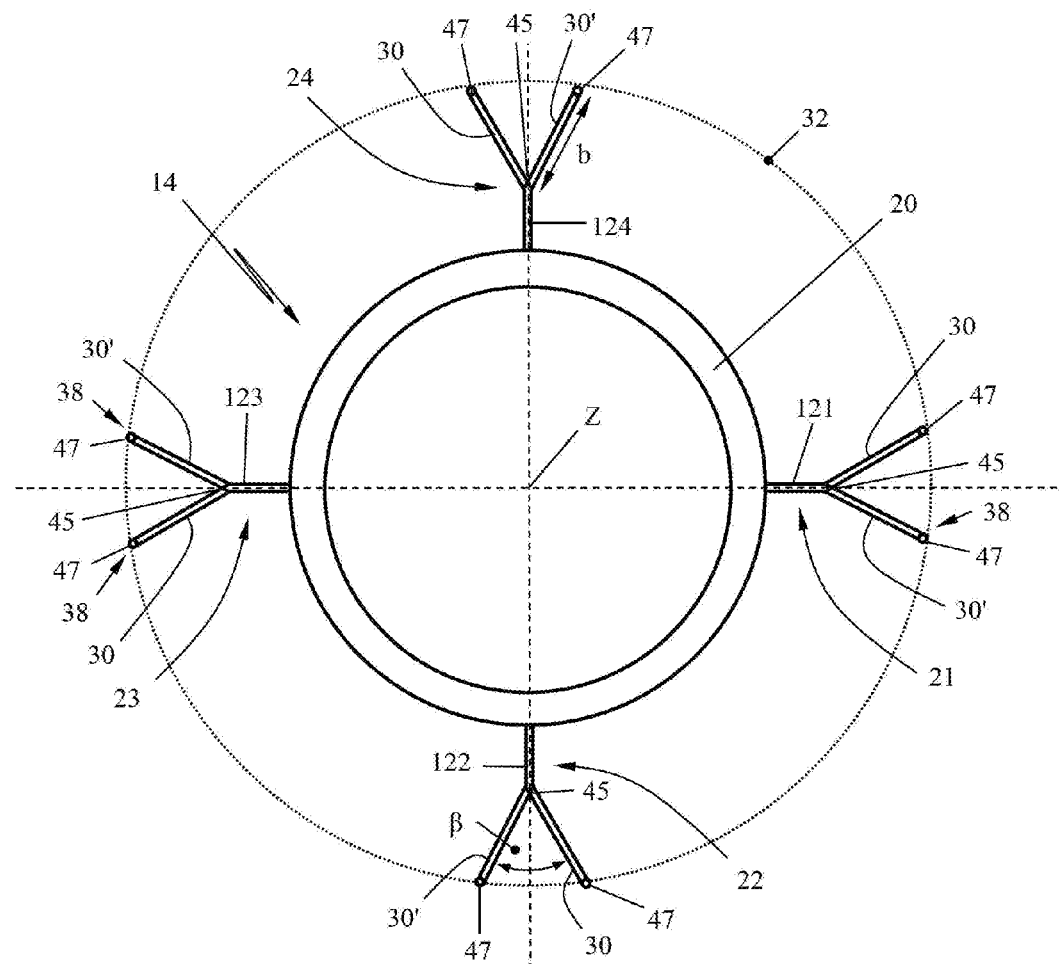
FIG. 8 is a section view of a third embodiment of a support tube prior to installation in a guard tube.
Figure 9:
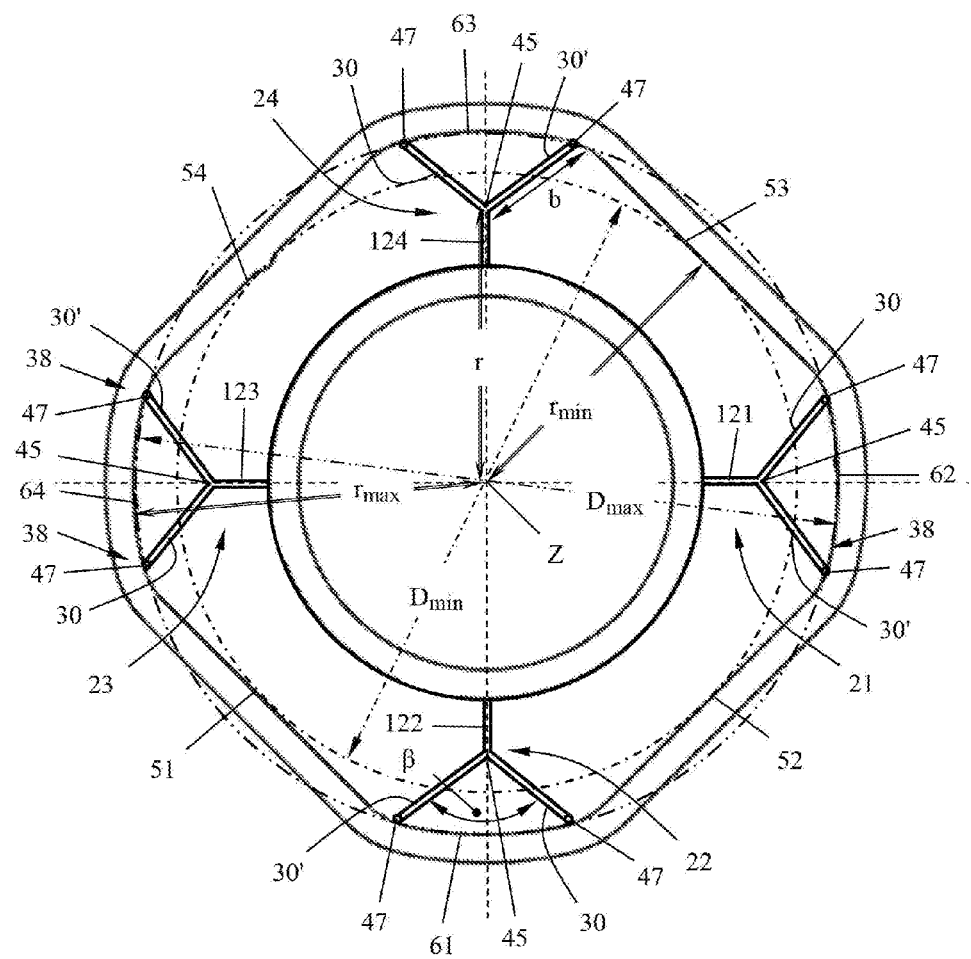
FIG. 9 is section view of the guard tube assembly with installed support tube according to FIG. 8.
Figure 10:
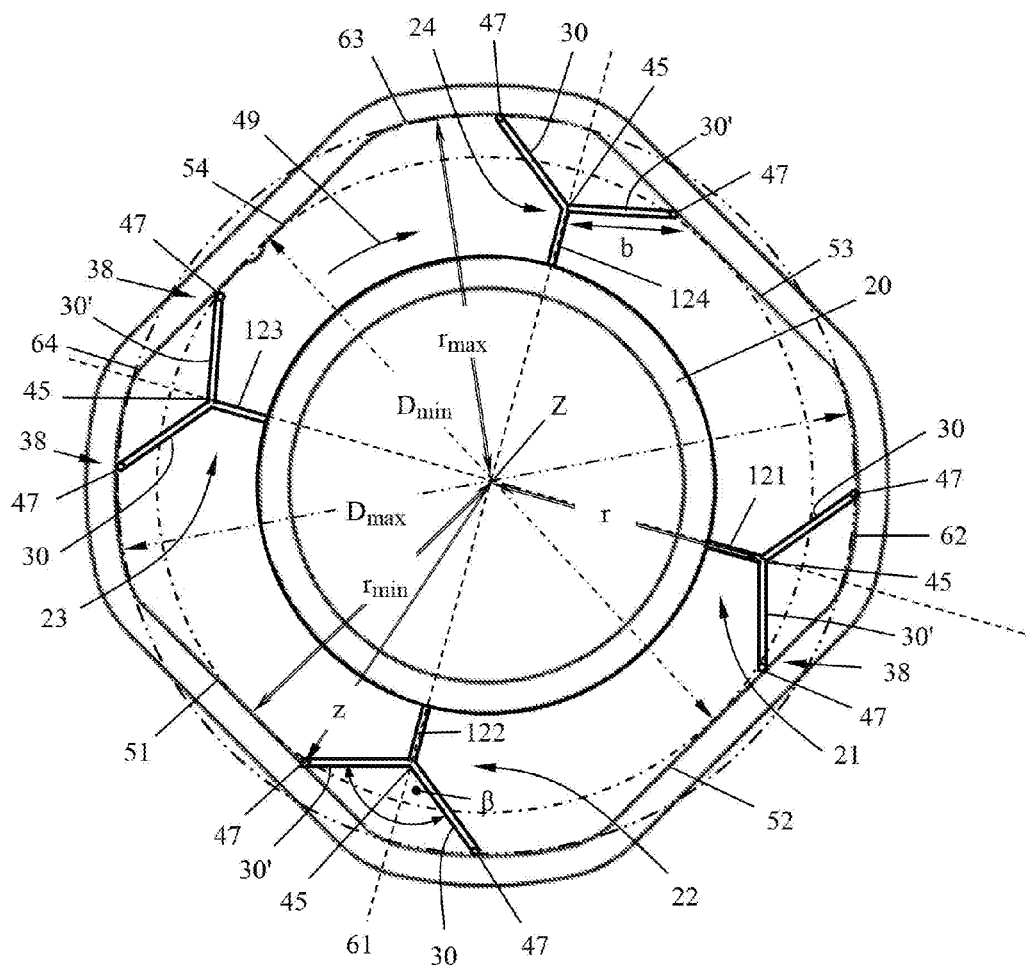
FIG. 10 is a section view of the guard tube assembly according to FIG. 9 illustrating the support tube according to FIG. 8 under rotary load.

In particular in case of a cross section with T-shaped configuration, the tabs 30, 30' project with their outer boundary contour 47 radially past the support rib 121, 122, 123, 124, as illustrated in FIGS. 8 to 10. The tabs 30, 30' delimit an opening angle β which has a magnitude of 0°<β<180°. Due to the opening angle β, in cross section a Y-shaped configuration results as illustrated in FIGS. 8 to 10.

Advantageously, the tabs 30, 30' have a reduced stiffness in comparison to the support rib 121, 122, 123, 124 itself. The free end 38 of each tab 30, 30' can be elastically deflected by application of a force relative to the support ribs 121, 122, 123, 124, in particular elastically deflected to a limited extent. The tabs 30, 30' by application of a pretensioning force or a maximum force can be forced inwardly in the direction toward the bearing sleeve 20 so that a "mounting-ready" or "maximally deflected" state is achieved. The elastic deformation can be achieved by configuration of the connecting location 45 of support rib 121, 122, 123, 124 and tab 30, 30' and/or by appropriate properties of the tab 30, 30' itself, in particular by their cross section shape and by selection of a suitable material. A suitable material can be plastic material. The tabs 30, 30' have advantageously a flat cross section as is illustrated schematically in FIGS. 8 to 10. The tab 30, 30' can also be curved and/or angled and/or provided with a portion 31 of reduced material thickness in accordance with FIG. 6.

In the undeformed state according to FIG. 8, the diameter circle 32 of the tabs 30, 30' is greater than the maximum inner diameter $D_{max}$ of the guard tube 4. In the deformed installed state according to FIG. 9, the diameter circle 32 of the tabs 30, 30' is smaller than the maximum inner diameter $D_{max}$ of the guard tube 4 and greater than the minimum inner diameter $D_{min}$ of the guard tube 4.

The tabs 30, 30' contact at least partially the inner contour 18 of the guard tube 4 and exert as a result of their elastic deformation an elastic pressing force onto the inner contour 18 of the guard tube 4.

In such an embodiment, the anti-rotation securing action is effected in that the free end 38 of the tabs 30, 30' and/or the radially outwardly positioned boundary contour 47 of the tabs 30, 30' contacts the flat side of the first circumferential section 51, 52, 53, 54 of the tube cross section 17. The elastic deformability of the tabs 30, 30' is adjusted such that the rotation force 49 which is occurring in operation deflects the tabs 30, 30' maximally up to a "maximally deflected state". In this state, the spacing z (FIGS. 10, 13) of the outermost boundary contour 47 of the tab 30' relative to the center Z is still greater than the minimal inner radius $r_{min}$ of the guard tube 4.

As illustrated in the Figures, the boundary contour is contacting the inner contour 18 of the tube cross section 17 in a position rotated by an angular displacement 47 relative to the tube cross section 17. The boundary contour 47 is positioned off center to the rounded circumferential section 61, 62, 63, and 64 of the tube cross section 17.

In this way, a first support action of a tab 30 is effected on a first circumferential section 51, 52, 53, 54 and a second support action of a tab 30' on a second circumferential section 61, 62, 63, 64. In this way, the support tube 14 is secured against rotation in the guard tube 4. The support tube 14 can be mounted easily in the guard tube 4. Even for greater manufacturing tolerances, an anti-rotation securing action is reliably ensured.

Figure 11:
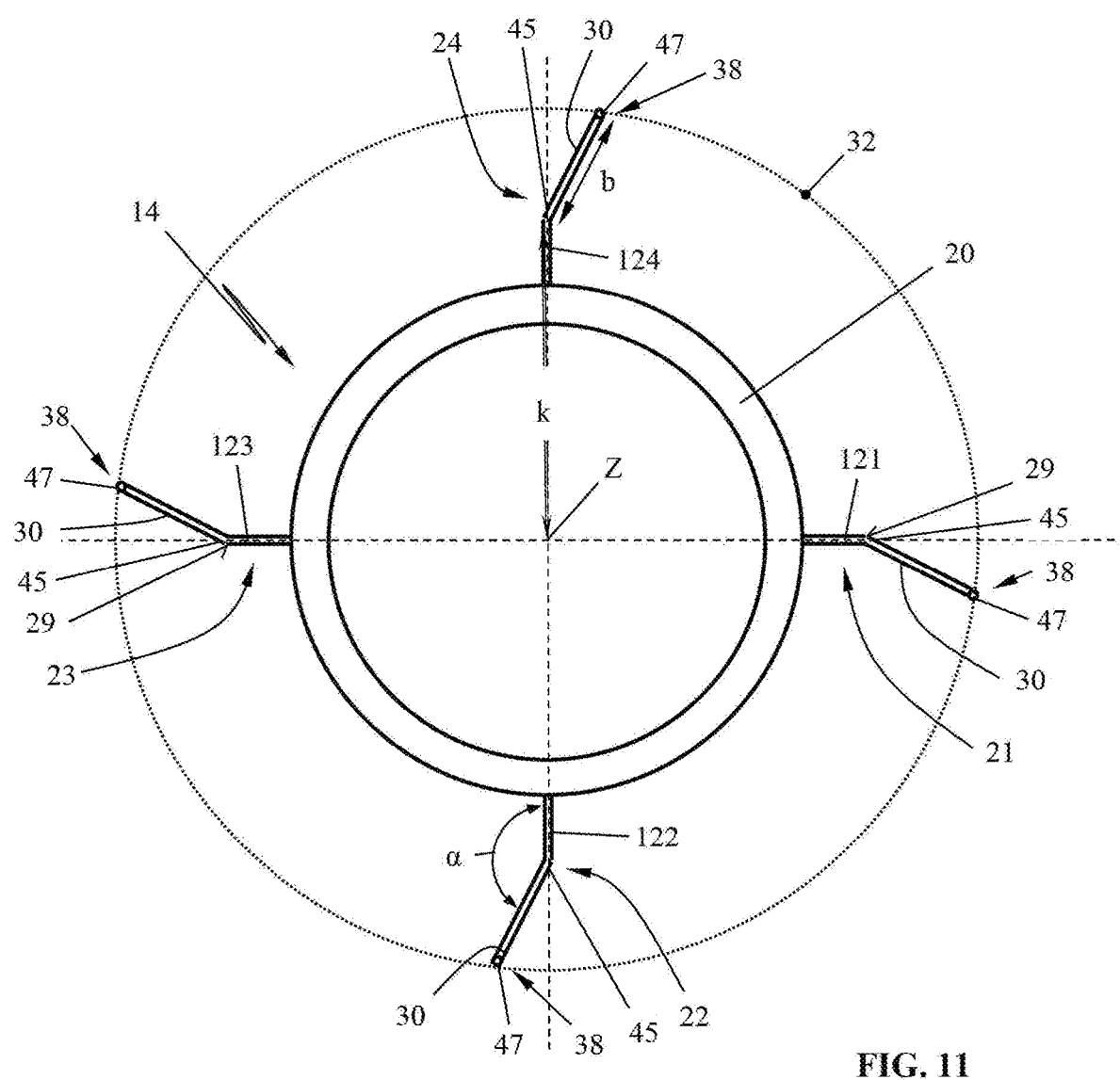
FIG. 11 shows a section view of a fourth embodiment of a support tube prior to installation in a guard tube.
Figure 12:
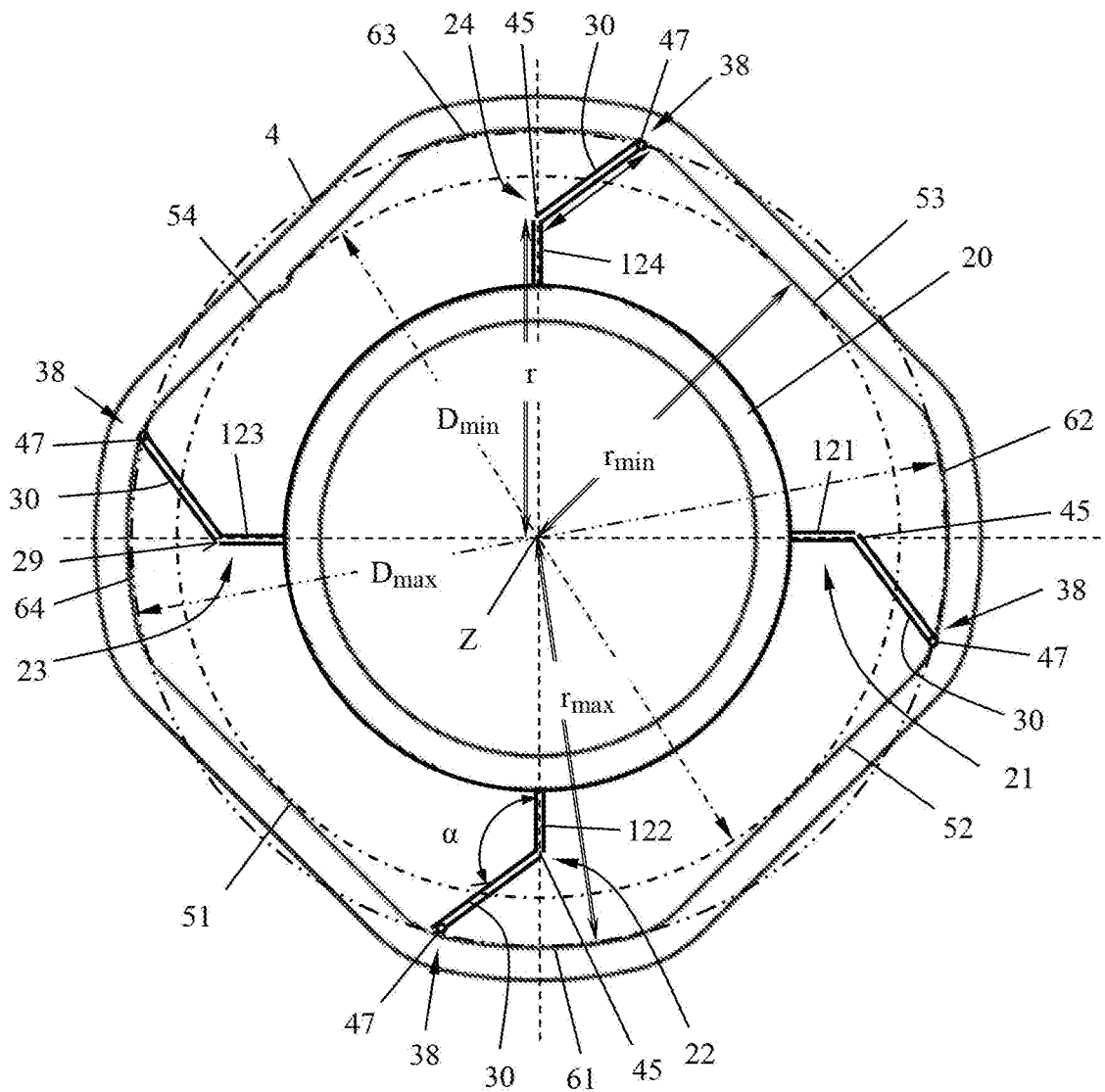
FIG. 12 is a section view of a guard tube assembly with installed support tube according to FIG. 11.
Figure 13:
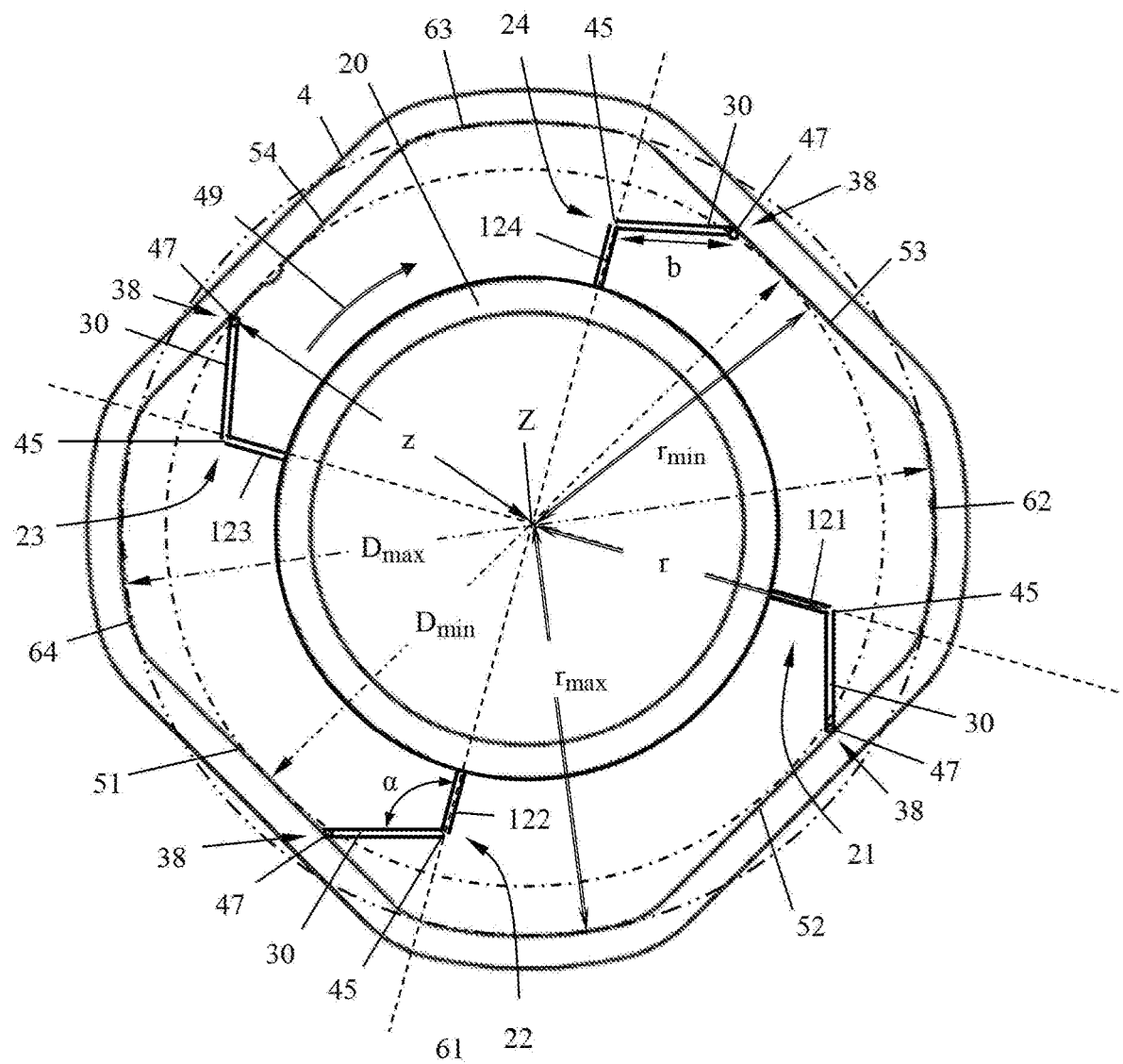
FIG. 13 is a section view of the guard tube assembly according to FIG. 12 with the support tube according to FIG. 11 under rotary load.

In the embodiment according to FIGS. 11 to 13, the support rib 121, 122, 123, 124 is projecting away from the bearing sleeve 20, in particular radially. The support rib 121, 122, 123, 124 ends with its longitudinal edge 29 within the minimal inner diameter $D_{min}$. The connecting locations 45 of the tabs 30 adjoining the longitudinal edge 29 are positioned thus within the minimum inner diameter $D_{min}$.

The tab 30 delimits with the support rib 121, 122, 123, 124 an angle α which in the embodiment according to FIGS. 11 to 13 is between 90° and 180°. The tab 30 is thus positioned at a slant to the support rib 121, 122, 123, 124. In the unloaded not yet mounted state according to the cross section in FIG. 11, the boundary contours 47 of the tabs 30 are positioned on a diameter circle 32 whose diameter is greater than the maximum inner diameter $D_{max}$. The tabs 30 and/or the support ribs 121, 122, 123, 124 are expediently elastically configured. By depressing the tabs 30 in the direction of the bearing sleeve 20, the angle α becomes smaller. By the depressing action, a tensioning force is created which holds and clamps the support tube 14 in the guard tube 4.

As shown in FIG. 12, the tabs 30 with their free end sections 38 are resting against the rounded circumferential sections 61, 62, 63, 64. The clamping force which is applied by compression is usually sufficient to secure the support tube 14 against rotary entrainment.

In FIG. 13, it is assumed that a rotary force 49 is applied to the bearing sleeve 20. As a result of the rotary force 49, the boundary contours 47 are displaced from the maximum inner diameter $D_{max}$ according to FIG. 12 to the minimum inner diameter $D_{min}$ of the guard tube 4. This generates an increased tension force which supports the support tube 14 relative to the rotary force 49.

Special features and advantages are disclosed for the respective embodiments which can be transferred also onto respective other embodiments. All features and advantages of the described embodiments are mutually exchangeable or combinable with each other.

The specification incorporates by reference the entire disclosure of European priority document 16 000 679.7 having a filing date of Mar. 21, 2016.

While specific embodiments of the invention have been shown and described in detail to illustrate the inventive principles, it will be understood that the invention may be embodied otherwise without departing from such principles.

What is claimed is:

1. A guard tube assembly for a drive shaft of a hand-guided power tool, the guard tube assembly comprising:
a guard tube comprising a first axial end and a second axial end, wherein an axial length of the guard tube is measured from the first axial end to the second axial end;
the guard tube comprising across the axial length a tube cross section deviating from a circular shape and comprising an inner contour and a center;
an inner support tube disposed inside the guard tube and configured to support a drive shaft, wherein the inner support tube and the drive shaft extend in a longitudinal direction of the guard tube;
the inner support tube comprising a central bearing sleeve and elastic support elements connected to the bearing sleeve, wherein the bearing sleeve is supported by the elastic support elements on the inner contour;
the inner contour comprising a first circumferential section and a second circumferential section, wherein the first circumferential section has a smallest spacing relative to the center and wherein the second circumferential section has a largest spacing relative to the center;
one or more of the elastic support elements comprising a contact surface contacting the inner contour and being spaced at a contact surface spacing relative to the center, and further comprising a support rib, wherein the support rib extends across an axial length of the bearing sleeve and comprises a projection embodied as a tab;
wherein the contact surface comprises a contact surface area provided on the tab;
wherein the contact surface spacing relative to the center is longer than the smallest spacing of the first circumferential section relative to the center and shorter than or identical to the largest spacing of the second circumferential section relative to the center.

2. The guard tube assembly according to claim 1, wherein, relative to the center of the tube cross section, two of said elastic support elements comprising the contact surface are arranged opposite each other on the bearing sleeve, wherein the contact surface comprises a contact surface area provided on the support rib, and wherein a spacing of the contact surface area provided on the support rib relative to the center is identical for said two elastic support elements with the contact surface.

3. The guard tube assembly according to claim 2, wherein the contact surface area provided on the tab contacts the second circumferential section.

4. The guard tube assembly according to claim 1, wherein the tube cross section is angular across the axial length and comprises longitudinal edges that extend in the axial direction and are rounded in a circumferential direction of the tube cross section.

5. A guard tube assembly for a drive shaft of a hand-guided power tool, the guard tube assembly comprising:
a guard tube comprising a first axial end and a second axial end, wherein an axial length of the guard tube is measured from the first axial end to the second axial end;
the guard tube comprising across the axial length a tube cross section deviating from a circular shape and comprising an inner contour and a center;
an inner support tube disposed inside the guard tube and configured to support a drive shaft, wherein the inner support tube and the drive shaft extend in a longitudinal direction of the guard tube;
the inner support tube comprising a central bearing sleeve and elastic support elements connected to the bearing sleeve, wherein the bearing sleeve is supported by the elastic support elements on the inner contour;
the inner contour comprising a first circumferential section and a second circumferential section, wherein the first circumferential section has a smallest spacing relative to the center and wherein the second circumferential section has a largest spacing relative to the center;
one or more of the elastic support elements comprising a contact surface contacting the inner contour and being spaced at a contact surface spacing relative to the center;
wherein the contact surface spacing relative to the center is longer than the smallest spacing of the first circumferential section relative to the center and shorter than or identical to the largest spacing of the second circumferential section relative to the center;

wherein the tube cross section is angular across the axial length and comprises longitudinal edges that extend in the axial direction and are rounded in a circumferential direction of the tube cross section;

wherein the contact surface is positioned in the area of one of the longitudinal edges of the tube cross section and is positioned with an angular displacement relative to a longitudinal edge center line of said one longitudinal edge of the tube cross section.

6. A guard tube assembly for a drive shaft of a hand-guided power tool, the guard tube assembly comprising:

a guard tube comprising a first axial end and a second axial end, wherein an axial length of the guard tube is measured from the first axial end to the second axial end;

the guard tube comprising across the axial length a tube cross section deviating from a circular shape and comprising an inner contour and a center;

an inner support tube disposed inside the guard tube and configured to support a drive shaft, wherein the inner support tube and the drive shaft extend in a longitudinal direction of the guard tube;

the inner support tube comprising a central bearing sleeve and elastic support elements connected to the bearing sleeve, wherein the bearing sleeve is supported by the elastic support elements on the inner contour;

the inner contour comprising a first circumferential section and a second circumferential section, wherein the first circumferential section has a smallest spacing relative to the center and wherein the second circumferential section has a largest spacing relative to the center;

one or more of the elastic support elements comprising a contact surface contacting the inner contour and being spaced at a contact surface spacing relative to the center;

wherein the contact surface spacing relative to the center is longer than the smallest spacing of the first circumferential section relative to the center and shorter than or identical to the largest spacing of the second circumferential section relative to the center;

wherein the tube cross section is angular across the axial length and comprises longitudinal edges that extend in the axial direction and are rounded in a circumferential direction of the tube cross section;

wherein said elastic support elements comprising the contact surface each comprise an axial support rib extending in an axial direction of the bearing sleeve and positioned in the area of one of the longitudinal edges, wherein the axial support rib in a circumferential direction of the bearing sleeve is positioned with angular displacement relative to a longitudinal edge center line of said one longitudinal edge.

7. A guard tube assembly for a drive shaft of a hand-guided power tool, the guard tube assembly comprising:

a guard tube comprising a first axial end and a second axial end, wherein an axial length of the guard tube is measured from the first axial end to the second axial end;

the guard tube comprising across the axial length a tube cross section deviating from a circular shape and comprising an inner contour and a center;

an inner support tube disposed inside the guard tube and configured to support a drive shaft, wherein the inner support tube and the drive shaft extend in a longitudinal direction of the guard tube;

the inner support tube comprising a central bearing sleeve and elastic support elements connected to the bearing sleeve, wherein the bearing sleeve is supported by the elastic support elements on the inner contour;

the inner contour comprising a first circumferential section and a second circumferential section, wherein the first circumferential section has a smallest spacing relative to the center and wherein the second circumferential section has a largest spacing relative to the center;

one or more of the elastic support elements comprising a contact surface contacting the inner contour and being spaced at a contact surface spacing relative to the center;

wherein the contact surface spacing relative to the center is longer than the smallest spacing of the first circumferential section relative to the center and shorter than or identical to the largest spacing of the second circumferential section relative to the center;

wherein said elastic support elements comprising the contact surface each comprise an axial support rib extending in an axial direction of the bearing sleeve and further comprise a tab, wherein the axial support rib comprises a longitudinal edge, wherein the tab is connected laterally to the longitudinal edge of the axial support rib, and wherein the tab has a tab width extending in a circumferential direction of the bearing sleeve.

8. The guard tube assembly according to claim 7, wherein the tab extends across an entire axial length of the support rib.

9. The guard tube assembly according to claim 7, wherein two of said elastic support elements comprising the contact surface are provided and the tabs thereof point in the same rotational direction.

10. The guard tube assembly according to claim 7, wherein two of said elastic support elements comprising the contact surface are neighboring each other and the tabs thereof are facing each other in the circumferential direction of the bearing sleeve.

11. The guard tube assembly according to claim 7, wherein the tab is resting with pretension on the inner contour of the tube cross section.

12. The guard tube assembly according to claim 7, wherein the tube cross section is angular across the axial length and comprises longitudinal edges that extend in an axial direction and are rounded in a circumferential direction of the tube cross section, wherein the tab is resting at least partially flat against one of the rounded longitudinal edges of the inner contour of the tube cross section.

13. The guard tube assembly according to claim 7, wherein the contact surface is formed on the longitudinal edge of the axial support rib.

14. The guard tube assembly according to claim 7, wherein the contact surface is formed on a longitudinal edge of the tab.

15. The guard tube assembly according to claim 7, wherein the contact surface is formed on a longitudinal edge of the tab and on the longitudinal edge of the axial support rib.

16. The guard tube assembly according to claim 7, wherein a longitudinal center axis of the support tube is positioned at a lateral spacing relative to a longitudinal center plane of the axial support rib.

17. A guard tube assembly for a drive shaft of a hand-guided power tool, the guard tube assembly comprising:
- a guard tube comprising a first axial end and a second axial end, wherein an axial length of the guard tube is measured from the first axial end to the second axial end;
- the guard tube comprising across the axial length a tube cross section deviating from a circular shape and comprising an inner contour and a center;
- an inner support tube disposed inside the guard tube and configured to support a drive shaft, wherein the inner support tube and the drive shaft extend in a longitudinal direction of the guard tube;
- the inner support tube comprising a central bearing sleeve and elastic support elements connected to the bearing sleeve, wherein the bearing sleeve is supported by the elastic support elements on the inner contour;
- the inner contour comprising a first circumferential section and a second circumferential section, wherein the first circumferential section has a smallest spacing relative to the center and wherein the second circumferential section has a largest spacing relative to the center;
- one or more of the elastic support elements comprising a contact surface contacting the inner contour and being spaced at a contact surface spacing relative to the center;
- wherein the contact surface spacing relative to the center is longer than the smallest spacing of the first circumferential section relative to the center and shorter than or identical to the largest spacing of the second circumferential section relative to the center;
- wherein said elastic support elements comprising the contact surface are distributed about a circumference of the inner contour at different angular spacings relative to each other, respectively.

* * * * *